(12) United States Patent
Deardurff et al.

(10) Patent No.: US 6,494,942 B1
(45) Date of Patent: Dec. 17, 2002

(54) DYE-BASED INK JET COMPOSITIONS HAVING IMPROVED STABILITY AND LIGHT FASTNESS

(76) Inventors: Larrie A Deardurff, 1009 NE. Kirsten Pl., Corvallis, OR (US) 97330; James David White, 2067 Wooded Knolls Dr., Philomath, OR (US) 97370; Christopher Lincoln, 1250 NW. 23rd St., Apt 22, Corvallis, OR (US) 97330

( * ) Notice: Subject to any disclaimer, the term of this patent is extended or adjusted under 35 U.S.C. 154(b) by 150 days.

(21) Appl. No.: 09/662,950

(22) Filed: Sep. 15, 2000

(51) Int. Cl.$^7$ ................................. C09D 11/02
(52) U.S. Cl. ................. 106/31.43; 106/31.49; 106/31.5; 106/31.58
(58) Field of Search ............ 106/31.43, 31.49, 106/31.5, 31.58

(56) References Cited

U.S. PATENT DOCUMENTS

| | | | |
|---|---|---|---|
| 3,519,429 A | | 7/1970 | Lestima ................. 96/100 |
| 3,725,067 A | | 4/1973 | Bailey et al. ............. 96/56.5 |
| 4,360,589 A | * | 11/1982 | Kojima et al. ............ 430/551 |
| 5,210,200 A | * | 5/1993 | Shimada et al. .......... 544/370 |
| 5,242,785 A | | 9/1993 | Morigaki et al. .......... 430/505 |
| 5,395,926 A | * | 3/1995 | Hari et al. ............... 106/496 |
| 5,508,421 A | * | 4/1996 | Suzuki et al. ............ 430/337 |
| 5,534,052 A | | 7/1996 | Mennicke et al. ....... 106/31.43 |
| 5,542,972 A | | 8/1996 | von der Eltz et al. ... 106/31.43 |
| 5,554,213 A | | 9/1996 | Radigan, Jr. et al. .... 106/31.43 |
| 5,753,017 A | * | 5/1998 | Onodera et al. ......... 106/31.47 |

FOREIGN PATENT DOCUMENTS

| | | | |
|---|---|---|---|
| EP | 0641669 A1 | 3/1995 | ............ B41M/1/36 |
| EP | 0769531 A1 | 10/1996 | ............ C09B/55/00 |
| JP | 10060344 | 3/1996 | ............ C09D/11/02 |

OTHER PUBLICATIONS

Journal of the Chemical Society, 1977, pp. 2047–2052, "Synthesis of 1H–Pyrazolo[3,2–c]–s–Triazoles and Derived Azamethine Dyes", Joseph Bailey, no month available.

J. Japan Synthetic Chemistry, 1991, 49, 541–553, no month available.

Journal of the Chemical Society, 1994, pp. 531–536, "Photochemical Reactions of 1H–Pyrazolo[1,5–b][1,2,4] Triazole Azomethine Dyes", Kazuhiko Furuya,, Nobuo Furutachi, Shohei Oda and Kazuhiro Maruyama, no month available.

European Search Report, from Carpmaels & Ransford, dated Nov. 23, 2001; 3 pages.

* cited by examiner

*Primary Examiner*—Helene Klemanski

(57) ABSTRACT

An aqueous ink jet ink is disclosed which comprises an effective amount of an azomethine dye having at least one water solubilizing functional group covalently attached thereto. The water solubilizing functional group can either be directly attached to the azomethine dye and/or can be attached to the azomethine dye through an electrophilic coupling moiety. If an organic spacer group is used to separate the water solubilizing functional group from azomethine dye or the electrophilic coupling moiety, then straight and branched chained alkyl groups having from about 1 to 10 carbon atoms is preferred. Preferred azomethine dyes can be pyrazolone azomethines, pyrazolotriazole azomethines, and combinations thereof. Additionally, an aqueous ink jet ink is disclosed comprising an effective amount of a dye-based colorant and an essentially water soluble spiroindane additive for improving light fastness and stability of the dye-based colorant.

36 Claims, No Drawings

DYE-BASED INK JET COMPOSITIONS HAVING IMPROVED STABILITY AND LIGHT FASTNESS

FIELD OF THE INVENTION

The present invention is drawn to dye-based ink jet ink compositions having improved stability and light fastness.

BACKGROUND OF THE INVENTION

In recent years, computer printer technology has evolved to a point where very high resolution images can be transferred to various types of media, including paper. One particular type of printing involves the placement of small drops of a fluid ink onto a media surface in response to a digital signal. Typically, the fluid ink is placed or jetted onto the surface without physical contact between the printing device and the surface. Within this general technique, the specific method that the ink jet ink is deposited onto the printing surface varies from system to system, and can include continuous ink deposit and drop-on-demand ink deposit.

With regard to continuous printing systems, inks used are typically based on solvents such as methyl ethyl ketone and ethanol. Essentially, continuous printing systems function as a stream of ink droplets ejected and directed by a printer nozzle. The ink droplets are directed additionally with the assistance of an electrostatic charging device in close proximity to the nozzle. If the ink is not used on the desired printing surface, the ink is recycled for later use. With regard to drop-on-demand printing systems, the ink jet inks are typically based upon water and glycols. Essentially, with these systems, ink droplets are propelled from a nozzle by heat or by a pressure wave such that all of the ink droplets ejected are used to form the printed image.

There are several reasons that ink jet printing has become a popular way of recording images on various media surfaces, particularly paper. Some of these reasons include low printer noise, capability of high speed recording, and multi-color recording. Additionally, these advantages can be obtained at a relatively low price to consumers. However, though there has been great improvement in ink jet printing, accompanying this improvement are increased demands by consumers in this area, e.g., higher speeds, higher resolution, full color image formation, increased stability, etc. As new ink jet inks are developed, there have been several traditional characteristics to consider when evaluating the ink in conjunction with a printing surface or substrate. Such characteristics include edge acuity and optical density of the image on the surface, dry time of the ink on the substrate, adhesion to the substrate, lack of deviation of ink droplets, presence of all dots, resistance of the ink after drying to water and other solvents, long term storage stability, and long term reliability without corrosion or nozzle clogging. Though the above list of characteristics provides a worthy goal to achieve, there are difficulties associated with satisfying all of the above characteristics. Often, the inclusion of an ink component meant to satisfy one of the above characteristics can prevent another characteristic from being met. Thus, most commercial inks for use in ink jet printers represent a compromise in an attempt to achieve at least an adequate response in meeting all of the above listed requirements.

In general, ink jet inks are either dye- or pigment-based inks. Dye-based ink jet inks generally use a liquid colorant that is usually water-based to turn the media a specific color. Because of their makeup, dye-based inks are usually not waterproof and tend to be more affected by UV light. This results in the color changing over time, or fading. For optimum performance, this type of ink has often required that the proper media be selected in accordance with the application, thus, reducing the choice of media for printing. Conversely, pigmented inks typically use a solid colorant to achieve color. In many cases, the line quality and accuracy of plots produced by pigment-based inks are usually superior to that of dye-based inks. With pigmented inks, solid particles adhere to the surface of the substrate. Once the water in the solution has evaporated, the particles will generally not go back into solution, and are therefore more waterproof. In addition, pigmented inks are much more UV resistant than dye-based inks, meaning that it takes much longer for noticeable fading to occur. Though pigmented inks, in some areas, exhibit superior characteristics, dyes tend to run cleaner, provide better yield, offer better particle size, and are easier to filter. Thus, dye-based inks have been more often used for common applications and have tended to be more chromatic and provide more highly saturated colors.

In order for ink jet prints to effectively compete with silver halide photography, one important improvement that must occur is that ink jet inks must improve their ability to remain stable to light exposure for longer periods of time. At this point in time, photographs typically will last much longer under prolonged light exposure, i.e., about 14–18 years under fluorescent light exposure. Conversely, some of the best ink jet printers will produce prints that last for only about 6–8 years under similar conditions. Particularly, with respect to dye-based ink jet ink, the phenomenon of discoloration occurs even more readily than is typical for pigment-based ink jet inks. However, as described above, dye-based inks are sometimes preferred because they are very convenient to use and have good distinction of color.

In the photographic industry, technologies have been developed which have been reported to last much longer than the typical 14–18 years, and even up to 60 years. Such long lasting ink stability has been attributed to a very stable magenta dye which is, in part, the subject of U.S. Pat. No. 5,242,785. That patent reports many new dyes and additives that have very good light fastness (2% dye loss after 16.5 years of simulated light exposure). However, though these dyes are very stable under prolonged light exposure, these dyes are not water-soluble and contain long chain organic groups necessary for anchoring dyes in photographic media. Such structures are not useable in aqueous-based ink jet systems.

Thus, it would be useful to provide aqueous ink jet inks for printing on media such that the inks are more stable under prolonged light exposure and/or exhibit good light fastness. This can be accomplished by providing dyes and/or additives for aqueous ink jet inks that improve these and other important properties.

SUMMARY OF THE INVENTION

An aqueous ink jet ink is disclosed which comprises an effective amount of an azomethine dye having at least one water solubilizing functional group covalently attached thereto wherein the water solubilizing functional group is directly attached to the azomethine dye or is attached to the azomethine dye through an electrophilic coupling moiety. If an organic spacer group is used to separate the water solubilizing functional group from azomethine dye or the electrophilic coupling moiety, then straight and branched chained alkyl linkers or spacers having from about 1 to 10 carbon atoms are preferred. Preferred azomethine dyes can be pyrazolone azomethines, pyrazolotriazole azomethines, and combinations thereof. Additionally, an aqueous ink jet ink is disclosed comprising an effective amount of a dye-based colorant and an essentially water soluble spiroindane additive for improving light fastness and stability of various dye-based colorants.

DETAILED DESCRIPTION OF THE INVENTION

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a", "an", and "the" include plural referents unless the content clearly dictates otherwise.

The term "water solublizing functional group" is meant to define a group imparting hydrophilic properties such as sulfonic acids, carboxylic acids, sugars, quaternary amines, polyethers, phosphoric acids, boronic acids, and combinations thereof, or other similar hydrophilic groups.

The term "electrophilic coupling moiety" refers to a linkage through which the water solubilizing functional group can be coupled to an aromatic ring of an azomethine dye or to a linking spacer group that is, in turn, coupled to an aromatic ring of an azomethine dye. Representative of suitable coupling moieties are members selected from the group consisting of amide, amine, sulfonamide, sulfonyl, and ester linkages.

The term "spacer" is meant to include an aliphatic straight or branched chain hydrocarbon having from about one to ten carbon atoms that link the water solubilizing functional group to the azomethine dye. The spacer can be linked to either the water solubilizing functional group or to an aromatic ring of the azomethine dye through an electrophilic coupling moiety.

With regard to any structure where a water solublizing functional group has been added, the term "soluble" includes any structure that has been solubilized to the extent that it is functional in an aqueous based ink.

With this in mind, an aqueous ink jet ink comprising an effective amount of an azomethine dye having at least one water solubilizing functional group covalently attached thereto is disclosed. The water solubilizing functional group can be either directly attached to the azomethine dye and/or can be attached through an electrophilic coupling moiety. If an organic spacer is used to separate the water solubilizing functional group from azomethine dye or the electrophilic coupling moiety, then straight and branched chained alkyl spacers having from about 1 to 10 carbon atoms are preferred. The azomethine dye is preferably present in the ink jet ink at from about 0.1% to 10% by weight, though any effective amount may be used. Additionally, the azomethine dye is preferably selected from the group consisting of pyrazolone azomethines, pyrazolotriazole azomethines, and combinations thereof.

Since ink jet inks are typically water-based, at least one water solubilizing functional group must be attached to the azomethine dye in order to improve the solubility of the dyes. Preferably, a plurality of water solubilizing functional groups are covalently attached to the dyes. The water solubilizing functional group can be selected from the group consisting of sulfonic acids, carboxylic acids, sugars, quaternary amines, polyethers, phosphoric acids, boronic acids, and combinations thereof, though other groups functional for solubilizing the dyes can be used in conjunction with the present invention. In a preferred embodiment, sulfonic acid groups are covalently attached to the azomethine dyes either directly to an aromatic ring, or through an electrophilic coupling moiety.

The water solubilizing functional group can be covalently attached to the azomethine dye in one or both of two preferred ways. First, the water solubilizing functional group can be covalently bonded directly to an aromatic ring on the dye. Alternatively, the water solubilizing functional group can be attached to the azomethine dye through an electrophilic coupling moiety such as an amide, an amine, a sulfonamide, a sulfonyl, or an ester. If two or more water solubilizing functional groups are attached to the azomethine dyes, in one embodiment, at least one water solubilizing functional group can be attached directly to an aromatic ring of the dye and at least one additional water solubilizing functional group can be covalently attached through an electrophilic coupling moiety.

Dyes 1 to 4 shown below provide examples of pyrazolone azomethine dyes that can be prepared in accordance with the present invention.

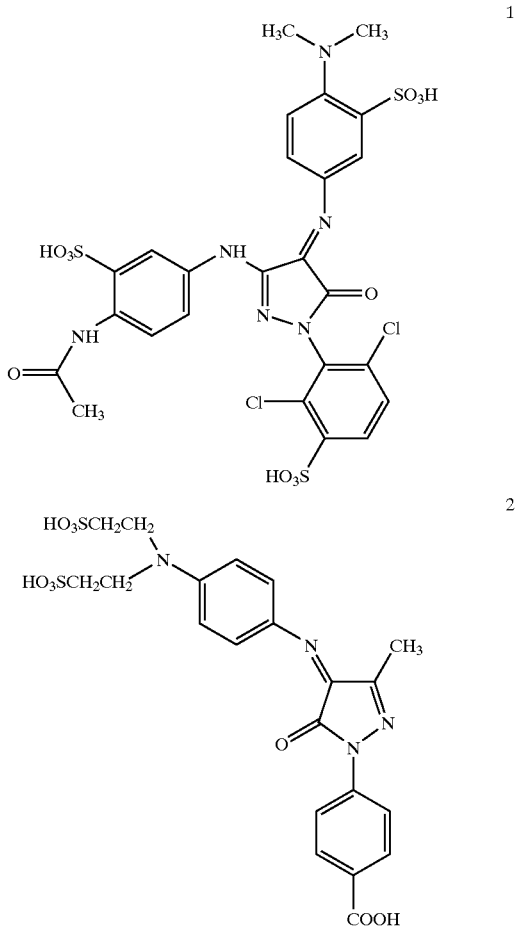

3

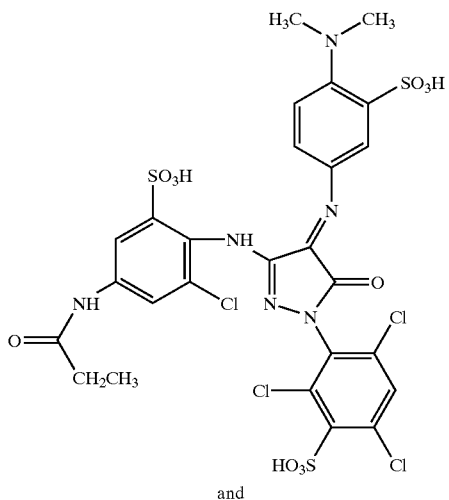

and

4

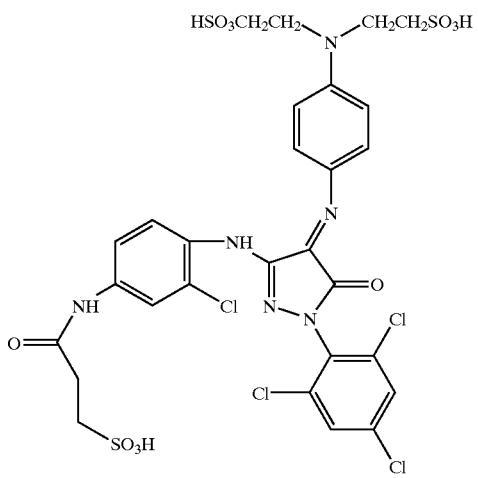

Additionally, dyes 5 and 6 shown below provide examples of pyrazolotriazole azomethine dyes that may be prepared in accordance with the present invention.

5

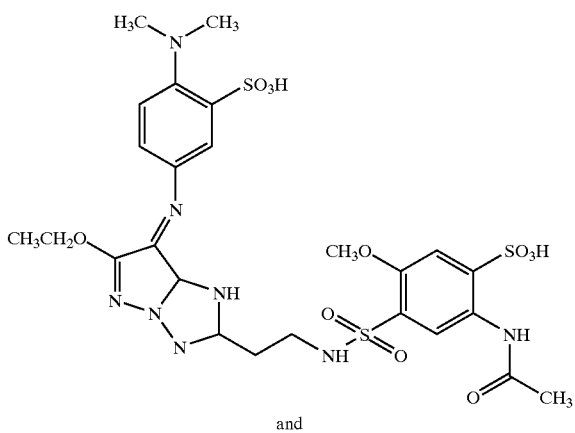

and

6

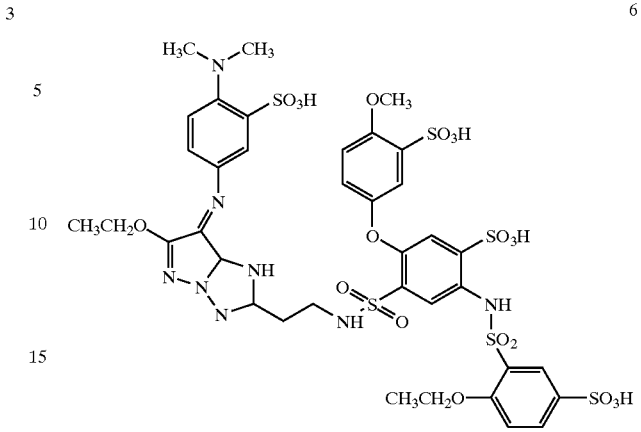

The pyrazolone azomethine and pyrazolotriazole azomethine structures shown above are not the only structures that are functional. These structures are merely meant to provide representative examples of functional structures. For example, though the pyrazolotriazole structures shown, i.e., dyes 5 and 6, are both pyrazolo-[1,2,4]-triazole structures, pyrazolo-[1,3,4]-triazole dye structures are also known and could be derivatized to likewise include water solubilizing functional groups in accordance with the present invention. Additionally, different water solubilizing functional groups can be used or different placement of water solubilizing functional groups can be effectuated, as long as the water solubilizing functional groups are not substantially substituted for groups that provide the color, light fastness, or other important dye function of the structure. For example, with regard to the dyes shown above, the groups that are believed to be essential to color stability and light fastness have been retained. Other groups have been replaced with sulfonic acid to improve the solubility of the structures. Additionally, in some dyes, certain appendages remain intact that can also be important in the dyes' light fastness properties. Note that the sulfonic acid groups (or other water solubilizing functional groups) do not necessarily need to be positioned on the aromatic rings. These groups can also be attached as part of various side chains through electrophilic coupling moieties, such as through an amide, amino, sulfonamide, sulfonyl, or ether linkages.

In addition to the azomethine dyes disclosed herein, lightfastness and stability can be enhanced in many different types of dye-based inks (including, but not limited to, the azomethine dyes disclosed herein) by the addition of certain additives. These various additives are stabilizing agents that are based upon a unique type of spiroindane compound which acts as an excited singlet state quencher for many dyes. When a dye is in an excited state, i.e., electrons at a higher energy level, degradation of the dye can occur. Thus, by using the spiroindane additives disclosed herein, the excited state of various dyes can be deactivated before they have substantial opportunity to degrade. Such action is believed to extend the stability and light fastness of the dyes with which the additive is mixed. Prior to the present disclosure, such spiroindane compounds were essentially water insoluble, and thus, have not been useful for use in aqueous ink jet inks. For example, tetra-hydroxy spiroindanes, which are not sufficiently soluble in water to be effectively used in ink jet inks, are currently available commercially.

It would be useful to prepare spiroindane additives for aqueous ink jet inks having similar properties as the tetrahydroxy spiroindanes currently known. Such additives can be prepared by modifying a tetra-hydroxy spiroindane by directly functionalizing the aromatic ring with appropriate water solubilizing functional groups, or preferably, by functionalizing the aromatic rings with water solubilizing functional groups through straight or branched spacers having from about 1 to 10 carbon atoms. More preferably, from 3 to 10 carbon atoms can be used in order to substantially maintain the quencher properties of the compound. One effective spacer is a straight chained propyl group.

Specifically, a spiroindane additive of the present invention can be defined as Formula 7 below:

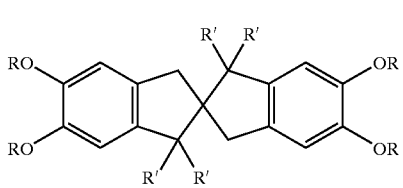

Formula 7 wherein each R group can independently be H or contain a water solubilizing functional group, with the proviso that at least one R group contain a water solubilizing functional group. The water solubilizing functional group can be covalently attached to the aromatic ring or can be attached through a spacer. However, though only one is required, it is preferred that from 2 to 4 R groups contain a water solubilizing functional group. Additionally, R' can be independently selected from the group consisting of H and straight or branched chain alkyl having from about 1 to 5 carbon atoms.

If the water solubilizing functional group is attached through a spacer, then straight or branched carbon chains having from about 1 to 10 carbons atoms are functional, though from 3 to 10 carbon atoms are preferred. Specifically, it is preferred that when the R group is a spacer/water solubilizing functional group combination, then the R group of Formula 7 be independently selected from the group consisting of —$R^2SO_3H$, —$R^2COOH$, —$R^2N(CH_3)_3^+$, and $R^2(CH_2CH_2O)_nCH_2CH_2OR^3$, where $R^2$ can be 1 or 2 carbon atoms, but is preferably a straight or branched carbon chain having from 3 to 10 carbons. However, as mentioned, a straight three carbon chain (propyl) is the most preferred, particularly with respect to the use of sulfonic acid as the solubilizing group. In the case of the polyetheylene oxide structure shown, n can be from 1 to 10 and $R^3$ can be H, $CH_3$, or $CH_2CH_3$. The water solubilizing functional groups can also be any other water solubilizing functional group that provides improved solubility. For example, groups including sugars, polyols, and pyridiniums, e.g., N-methylpyridinium, can be functional.

These spiroindane compounds, when incorporated into an aqueous dye-based ink, can be comprised of an effective amount of a dye-based colorant and an effective amount of the essentially water soluble spiroindane additive. However, about 1 to 20% by weight of the spiroindane additive is considered to be preferred. Additionally, though the stability and light fastness can be improved in many types of dye-based inks, stability and light fastness of the azomethine dyes of the present invention can further be improved by the spiroindane additives disclosed herein.

EXAMPLES

The following examples illustrate various formulations for preparing the ink jet ink compositions of the present invention, as well as provide data showing the effectiveness of adding the spiroindane additives disclosed herein. The following examples should not be considered as limitations of the present invention, but should merely teach how to make the best known ink jet ink formulations based upon current experimental data.

Example 1

A pyrazolone azomethine dye of the present invention was synthesized as shown below:

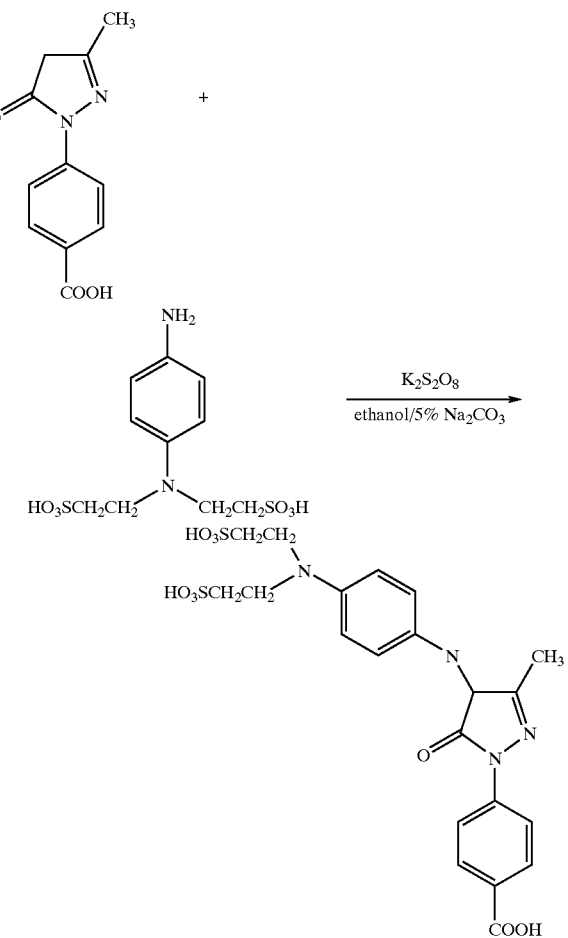

In the above formula, the pyrazolone azomethine dye [4-(3-methyl-4-(4-(N,N-di-(ethylsulfonic acid)amino)-1-phenylimino)-5-oxo-2-pyrazolin-yl)-benzoic acid] was prepared by adding 0.6 grams of potassium persulfate to a stirred mixture of 4-(3-methyl-5-oxo-2-pyrazolin-1-yl)-benzoic acid (1 mmol), N,N-di-(ethylsulfonic acid)-1,4-phenylenediamine (0.25 g), methanol (10 mL), and sodium carbonate in water (5%; 20 mL). The mixture was stirred for about 40 minutes and then additional water (70 mL) was added. The pyrazolone azomethine dye was collected by filtration, dried, and recrystalized with methanol or ethanol.

Example 2

A spiroindane additive of the present invention was synthesized as described and shown below:

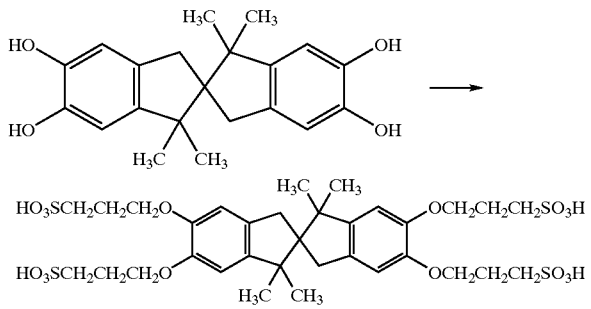

To a stirring suspension of NaH [5.88 g (60% dispersion in mineral oil), 4 eq.] in dimethyl sulfoxide (500 mL) was added 3,3,3',3'-tetramethyl-1,1'spirobisindane-5,5',6,6'-tetraol [10.40 g (96%), 29.4 mmol] in small portions under argon via a solid addition funnel. After the addition was complete, the mixture was allowed to stir at room temperature for 20 hours and sodium 3-bromopropanesulfonate [40 g (97%), 6 eq.] was added in small portions. The reaction mixture was then warmed to 50° C. and stirred until the reaction was complete (about 16 hours). Next, the reaction mixture was allowed to cool to room temperature and was added to 4.5 L of ethyl acetate with vigorous stirring. The suspension was filtered and the filter cake was air-dried. The collected solid was dissolved in benzene (400 mL) and 15% aqueous hydrochloric acid (200 mL) was added forming a biphasic mixture. This mixture was heated to reflux and water was removed by distillation. The benzene supernatant was then decanted from the deposited solids which were dissolved in hot dimethyl sulfoxide (350 mL, 55° C.) and filtered into ethyl acetate (3.5 L). The filtrate formed a precipitate which was filtered off and the collected solid was washed with ethyl acetate (100 mL). The collected solid was then triturated with ethanol (1 L), filtered, and washed with diethyl ether (500 mL). The filter cake was dried in vacuo to yield 22.80 g (94%) of product.

Example 3

Two samples of a magenta dye formulation known as AR81 [Acid Red 81 from the Color Index Name, available from Bayer; 3-(N-methylamino)-6-(4-sulfonic acid-1-amiobenzene)-2H,7H-benz[de]anthracen-2,7-dione, sodium salt] were tested for dye loss after being applied to paper. One of the two samples had 5% by weight of a water soluble spiroindane additive present and the other sample had no additive present. Each sample was imprinted onto two types of print media, i.e., HP Premium Plus Glossy and Mitsubishi 170. The four total ink sample/print media combinations were exposed to 60 Klux of cool-white fluorescent light for the equivalent of 6 years of normal exposure (450 lux per 12 day assumed as normal indoor light exposure). A dye loading of 3% (w/w) and an additive loading of 5% (w/w) was used. The ink vehicle consisted of (by weight) 8% 1,5-pentanediol, 6.5% 2-pyrolidinone, 7.5% Trimethylolpriopane, 1.5% TERGITOL™ 15-S-7, 0.5% TERGITOL™ 15-S-5, 0.2% FC-00, and 0.4% DOWFAX™ 8390. Each sample continued to be exposed to the fluorescent light until 20% dye loss had occurred in color patches having an initial optical density of 0.5. Table 1 below illustrates the results.

TABLE 1

| PAPER | DYE ONLY Years for 20% dye loss | DYE + ADDITIVE years for 20% dye loss |
|---|---|---|
| HP Premium Plus Glossy | 2.1 | 2.5 |
| Mitsubishi 170 | 3.5 | 4.5 |

The data in Table 1 shows that the spiroindane additive has a positive effect on a magenta dye on two specific papers. The fact that this type of additive has a positive effect on the ink tested is significant because, in general, many additives do not work to improve properties of ink jet inks. This is likely due to the fact that additives and dyes do not remain in close proximity once printed on the media. Thus, these spiroindane additives are not only useful in ink jet ink formulations, but good results can also be achieved if these additives are incorporated directly into the ink receiving layer of certain print media.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. An aqueous ink jet ink comprising an effective amount of an azomethine dye having at least one water solubilizing functional group covalently attached thereto, and wherein said water solubilizing functional group is directly attached to the azomethine dye or is attached through an electrophilic coupling moiety, and further comprising an effective amount of an essentially water soluble spiroindane additive.

2. The aqueous ink jet ink of claim 1 wherein the azomethine dye is selected from the group consisting of pyrazolone azomethine dyes, pyrazolotriazole azomethine dyes, and combinations thereof.

3. The aqueous ink jet ink of claim 2 wherein the azomethine dye is present at from about 0.1 to 10% by weight.

4. The aqueous ink jet ink of claim 2 wherein the water solubilizing functional group is selected from the group consisting of sulfonic acids, carboxylic acids, sugars, quaternary amines, polyethers, phosphoric acids, boronic acids, and combinations thereof.

5. The aqueous ink jet ink of claim 4 wherein the water solubilizing functional group is a sulfonic acid.

6. The aqueous ink jet ink of claim 1 wherein at least two water solubilizing functional groups are covalently attached to the azomethine dye.

7. The aqueous ink jet ink of claim 1 wherein the water solubilizing functional group is covalently attached directly to an aromatic ring of said dye.

8. The aqueous ink jet ink of claim 1 wherein the water solublizing functional group is covalently attached to the azomethine dye through an electrophilic coupling moiety selected from the group consisting of amides, amines, sulfonamides, sulfonyls, and esters.

9. The aqueous ink jet ink of claim 1 wherein the water solubilizing functional group is covalently attached to an aromatic ring or an electrophilic coupling moiety by a straight or branched carbon chain having from about 1 to 10 carbon atoms.

10. The aqueous ink jet ink of claim 1 having a plurality of water solubilizing functional groups wherein at least one water solubilizing functional group is covalently attached directly to an aromatic ring and at least one additional water solubilizing functional group is covalently attached through an electrophilic coupling moiety.

11. The aqueous ink jet ink of claim 2 wherein the pyrazolone azomethine dye is selected from the group consisting of

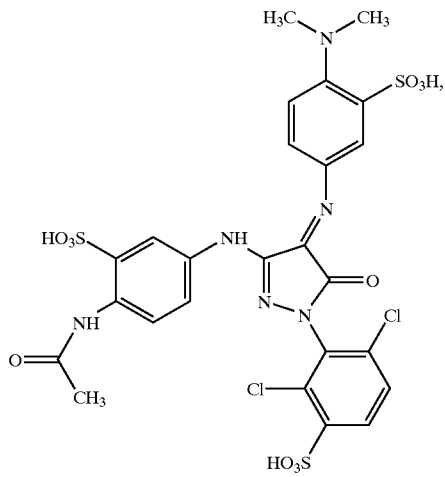

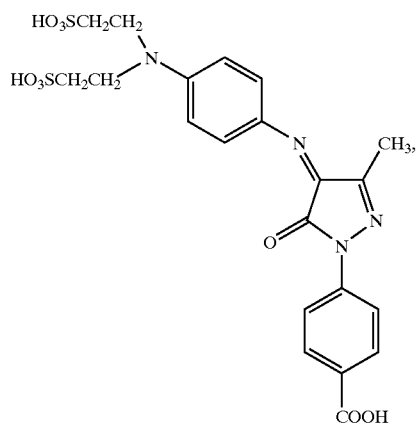

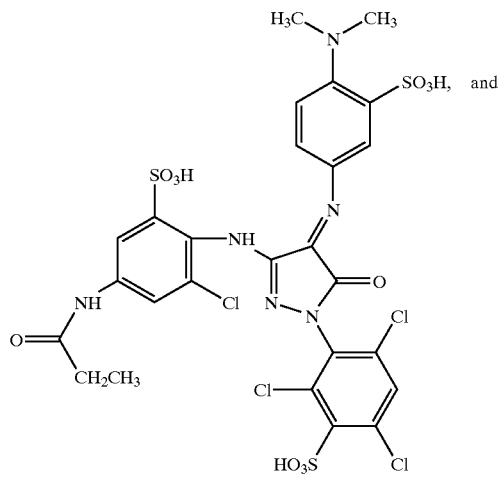

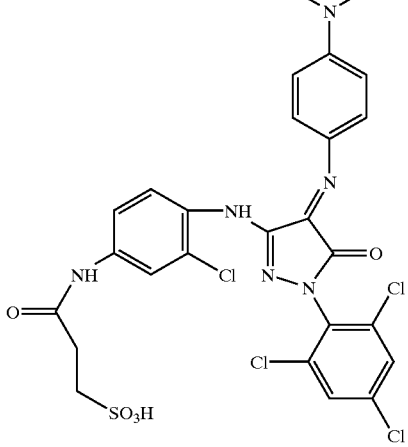

12. The aqueous ink jet ink of claim 2 wherein the pyrazolotriazole azomethine dye is selected from the group consisting of pyrazolo-[1,2,4]-triazole dyes, pyrazolo-[1,3,4]-triazole dyes, and combinations thereof.

13. The aqueous ink jet ink of claim 2 wherein the pyrazolotriazole azomethine dye is selected from the group consisting of

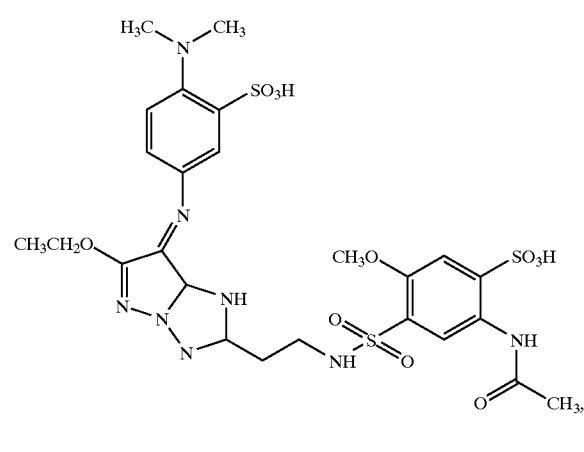

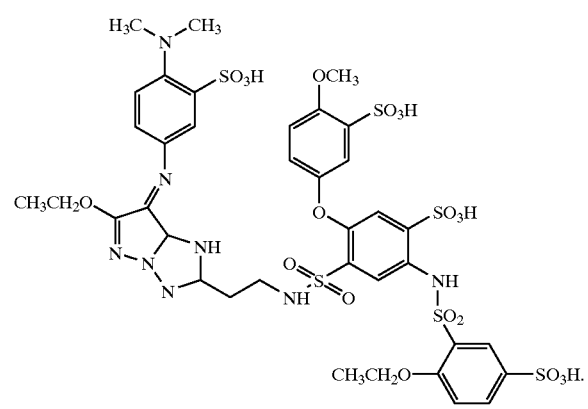

14. An aqueous ink jet ink comprising:
a) an effective amount of a dye-based colorant; and
b) an essentially water soluble spiroindane additive for improving light fastness and stability of the dye-based colorant.

15. The aqueous ink jet ink of claim 14 wherein the spiroindane additive is defined by the structure:

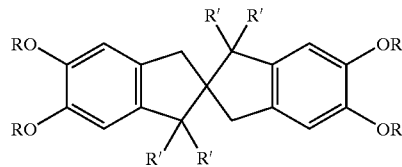

wherein R is independently selected from the group consisting of H and a constituent containing a water solubilizing functional group, with the proviso that at least one R group contain a water solubilizing functional group, and wherein R' is independently selected from the group consisting of H and straight or branched chain alkyl groups having from about 1 to 5 carbon atoms.

16. The aqueous ink jet ink of claim 15 wherein from 2 to 4 R groups are independently selected from the group consisting of —$R^2SO_3H$, —$R^2COOH$, —$R^2N(CH_3)_3^+$, $R^2(CH_2CH_2O)_nCH_2CH_2OR^3$, where $R^2$ is a straight or branched carbon chain having from 2 to 10 carbons, n is from 1 to 10, and $R^3$ is selected from the group consisting of H, $CH_3$, and $CH_2CH_3$.

17. The aqueous ink jet ink of claim 15 wherein from 2 to 4 R groups are independently selected from the group consisting of sugars, polyols, and pyridiniums.

18. The aqueous ink jet ink of claim 16 wherein $R^2$ is a propyl group.

19. The aqueous ink jet ink of claim 18 wherein the water solubilizing functional group is a sulfonic acid.

20. The aqueous ink jet ink of claim 14 wherein the spiroindane additive is present at from about 1 to 20% by weight.

21. The aqueous ink-jet ink of claim 1 wherein the wherein the spiroindane additive is defined by the structure:

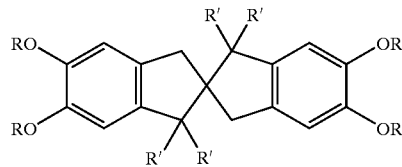

wherein R is independently selected from the group consisting of H and a constituent containing a water solubilizing functional group, with the proviso that at least one R group contain a water solubilizing functional group, and wherein R' is independently selected from the group consisting of H and straight or branched chain alkyl groups having from about 1 to 5 carbon atoms.

22. The aqueous ink jet ink of claim 21 wherein from 2 to 4 R groups are independently selected from the group consisting of —$R^2SO_3H$, —$R^2COOH$, —$R^2N(CH_3)_3^+$, $R^2(CH_2CH_2O)_nCH_2CH_2OR^3$, where $R^2$ is a straight or branched carbon chain having from 2 to 10 carbons, n is from 1 to 10, and $R^3$ is selected from the group consisting of H, $CH_3$, and $CH_2CH_3$.

23. The aqueous ink jet ink of claim 22 wherein from 2 to 4 R groups are independently selected from the group consisting of sugars, polyols, and pyridiniums.

24. The aqueous ink jet ink of claim 22 wherein $R^2$ is a propyl group.

25. The aqueous ink jet ink of claim 24 wherein the water solubilizing functional group is a sulfonic acid.

26. The aqueous ink jet ink of claim 1 wherein the spiroindane additive is present at from about 1 to 20% by weight.

27. An aqueous ink jet ink comprising an effective amount of a pyrazolone azomethine dye selected from the group consisting of

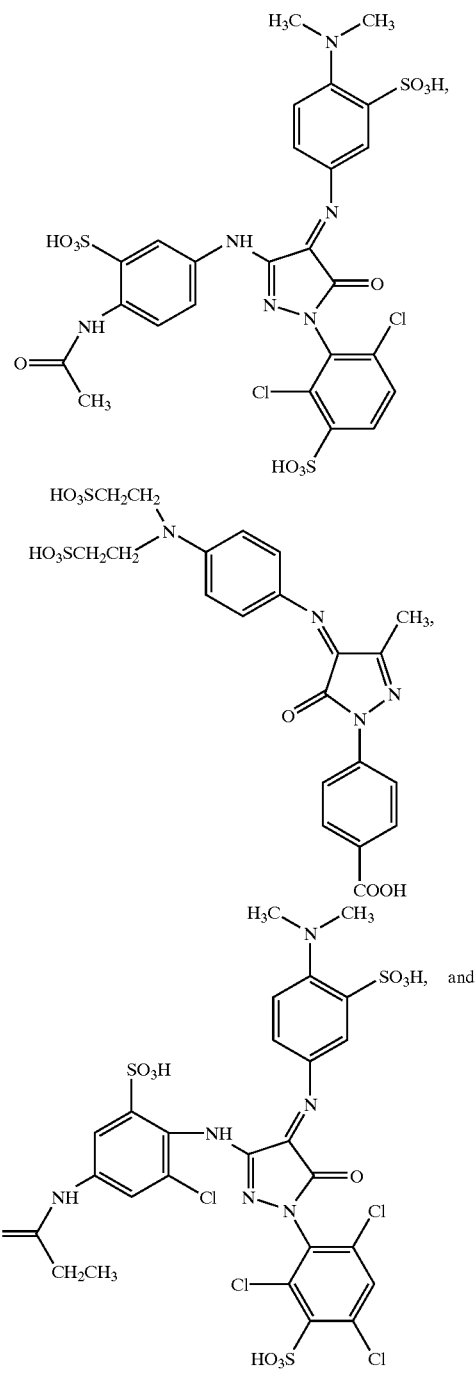

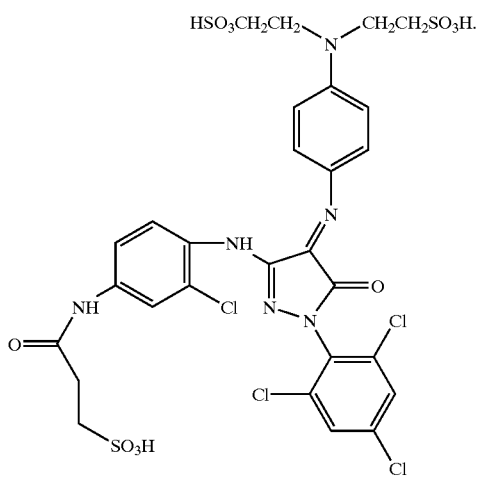

28. An aqueous ink jet ink comprising an effective amount of a pyrazolotriazole azomethine dye selected from the group consisting of

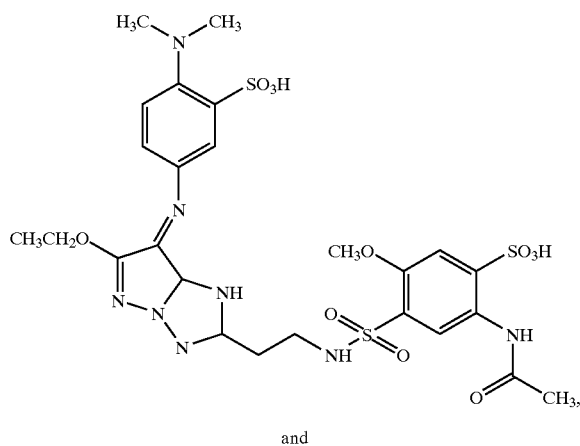

and

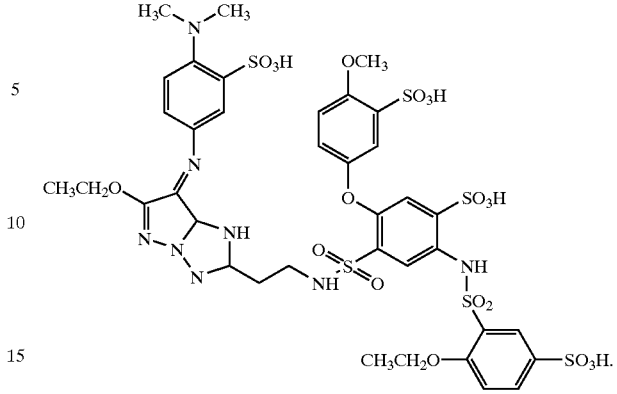

29. An aqueous ink jet ink comprising an effective amount of a pyrazolone azomethine dye having a water solubilizing functional group covalently attached thereto through an electrophilic coupling moiety.

30. The aqueous ink jet ink of claim 29 wherein the pyrazolone azomethine dye is present at from about 0.1 to 10% by weight.

31. The aqueous ink jet ink of claim 30 wherein the water solubilizing functional group is selected from the group consisting of sulfonic acids, carboxylic acids, sugars, quaternary amines, polyethers, phosphoric acids, boronic acids, and combinations thereof.

32. The aqueous ink jet ink of claim 31 wherein the water solubilizing functional group is a sulfonic acid.

33. The aqueous ink jet ink of claim 29 wherein at least two water solubilizing functional groups are covalently attached to the pyrazolone azomethine dye.

34. The aqueous ink jet ink of claim 29 wherein a second water solubilizing functional group is covalently attached directly to an aromatic ring of said dye.

35. The aqueous ink jet ink of claim 29 wherein the water solubilizing functional group is covalently attached to the electrophilic coupling moiety by a straight or branched carbon chain having from about 1 to 10 carbon atoms.

36. The aqueous ink jet ink of claim 29 having a plurality of water solubilizing functional groups wherein at least one water solubilizing functional group is covalently attached directly to an aromatic ring and at least one additional water solubilizing functional group is covalently attached through the electrophilic coupling moiety.

* * * * *